United States Patent
Zeira et al.

(10) Patent No.: US 7,133,366 B2
(45) Date of Patent: *Nov. 7, 2006

(54) MODELING OF HYBRID TIME-CODE DIVISION MULTIPLE ACCESS COMMUNICATION SYSTEMS

(75) Inventors: Eldad Zeira, Huntington, NY (US); Frank La Sita, East Setauket, NY (US)

(73) Assignee: InterDigital Technology Corporation, Wilmington, DE (US)

( * ) Notice: Subject to any disclaimer, the term of this patent is extended or adjusted under 35 U.S.C. 154(b) by 308 days.

This patent is subject to a terminal disclaimer.

(21) Appl. No.: 10/792,924

(22) Filed: Mar. 4, 2004

(65) Prior Publication Data

US 2004/0185790 A1    Sep. 23, 2004

Related U.S. Application Data

(63) Continuation of application No. 10/327,303, filed on Dec. 20, 2002, now Pat. No. 6,704,286.

(60) Provisional application No. 60/383,757, filed on May 28, 2002.

(51) Int. Cl.
*H04Q 7/34* (2006.01)
(52) U.S. Cl. .................. 370/241; 370/328; 370/342; 455/423
(58) Field of Classification Search ........... 370/241, 370/328, 329, 330, 335, 342; 455/446, 450
See application file for complete search history.

(56) References Cited

U.S. PATENT DOCUMENTS

| | | | |
|---|---|---|---|
| 5,671,218 A | | 9/1997 | I et al. |
| 5,799,154 A | | 8/1998 | Kuriyan |
| 5,920,607 A | * | 7/1999 | Berg .................. 379/1.01 |
| 6,014,567 A | | 1/2000 | Budka |
| 6,385,183 B1 | | 5/2002 | Takeo |
| 6,493,331 B1 | | 12/2002 | Walton et al. |
| 6,603,966 B1 | | 8/2003 | Sheffield |
| 6,704,286 B1 | * | 3/2004 | Zeira et al. ............... 370/241 |
| 6,711,404 B1 | * | 3/2004 | Arpee et al. .............. 455/423 |
| 6,810,246 B1 | * | 10/2004 | Kalofonos et al. ........ 455/423 |
| 6,829,491 B1 | * | 12/2004 | Yea et al. .................. 455/560 |
| 2005/0085233 A1 | * | 4/2005 | Boyer et al. .............. 455/446 |

* cited by examiner

*Primary Examiner*—Min Jung
(74) *Attorney, Agent, or Firm*—Volpe and Koenig, P.C.

(57) ABSTRACT

A model for a wireless code division multiple access communication system is generated. A plurality of first snapshots is provided. Each first snapshot has a plurality of user equipments (UEs) and base stations. Locations of the UEs in each first snapshot vary between the first snapshots. For each first snapshot, that first snapshot is divided into an uplink and downlink snapshot. For the uplink snapshot, uplink resources are assigned to each UE and an uplink transmission power level is determined of that UE. Dropped and not admitted UEs are determined in the uplink snapshot. For the downlink snapshot, downlink resources are assigned to each UE. Dropped and not admitted UEs are determined in the downlink snapshot based on the assigned downlink resources. Statistics are gathered on a performance of the system using the determined dropped and not admitted UEs.

5 Claims, 2 Drawing Sheets

MODELING OF HYBRID TIME-CODE DIVISION MULTIPLE ACCESS COMMUNICATION SYSTEMS

This application is a continuation of U.S. patent application Ser. No. 10/327,303, filed Dec. 20, 2002, now U.S. Pat. No. 6,704,286, which in turn claims priority from U.S. Provisional Application No. 60/383,757, filed May 28, 2002.

BACKGROUND

This invention generally relates to wireless code division multiple access communication systems. In particular, the invention relates to modeling such systems.

Figure 1:
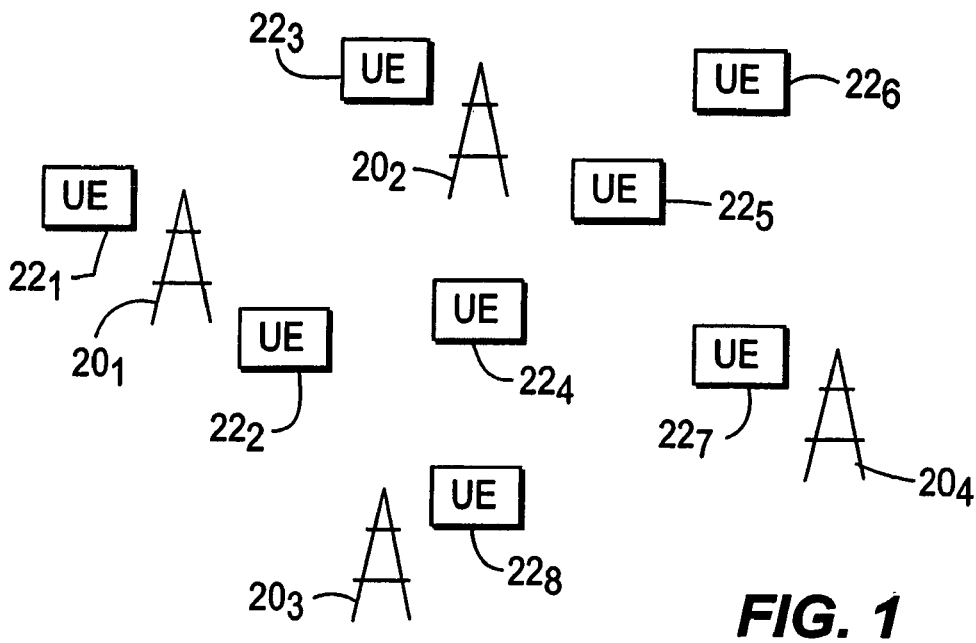

FIG. 1 is an illustration of a simplified wireless code division multiple access (CDMA) communication system. The system has a plurality of base stations $20_1$–$20_4$ (20) communicating with a plurality of user equipments (UEs) $22_1$–$22_8$ (22). Each UE 22 typically communicates with the base station 20 with the strongest signal. However, based on the allocation of radio resources, UEs 22 may communicate with base stations 20 not having the strongest signal. To illustrate, since base station $20_2$ has a heavier loading (UEs $22_3$–$22_6$) than base station $20_3$, UE $22_4$ may communicate with base station $20_3$ instead of closer base station $20_2$.

In such systems, radio resources need to be allocated to the users (UEs 22). This is commonly referred to as radio resource management. In a frequency division duplex (FDD)/CDMA communication system, the system allocates to users codes within frequency spectrums for communication (to support a session). In hybrid time division multiple access (TDMA)/CDMA communication systems, users are not only allocated codes within frequency spectrums but also selected time slots out of a set of time slots within the frequency spectrums for communication. In time division duplex (TDD)/CDMA communication systems, uplink and downlink communications are allocated to different time slots within a given frequency spectrum.

Due to the numerous combinations of potential allocations of resources to users, it is difficult to make an optimum allocation. As a system is operating, it is extremely difficult to take into account all the variables required to make resource allocations. Accordingly, it is desirable to be able to model such systems for use in evaluating resource allocation approaches.

SUMMARY

A model for a wireless code division multiple access communication system is generated. A plurality of first snapshots is provided. Each first snapshot has a plurality of user equipments (UEs) and base stations. Locations of the UEs in each first snapshot vary between the first snapshots. For each first snapshot, that first snapshot is divided into an uplink and downlink snapshot. For the uplink snapshot, uplink resources are assigned to each UE and an uplink transmission power level is determined of that UE. Dropped and not admitted UEs are determined in the uplink snapshot. For the downlink snapshot, downlink resources are assigned to each UE. Dropped and not admitted UEs are determined in the downlink snapshot based on the assigned downlink resources. Statistics are gathered on a performance of the system using the determined dropped and not admitted UEs.

BRIEF DESCRIPTION OF THE DRAWING(S)

Figure 2:
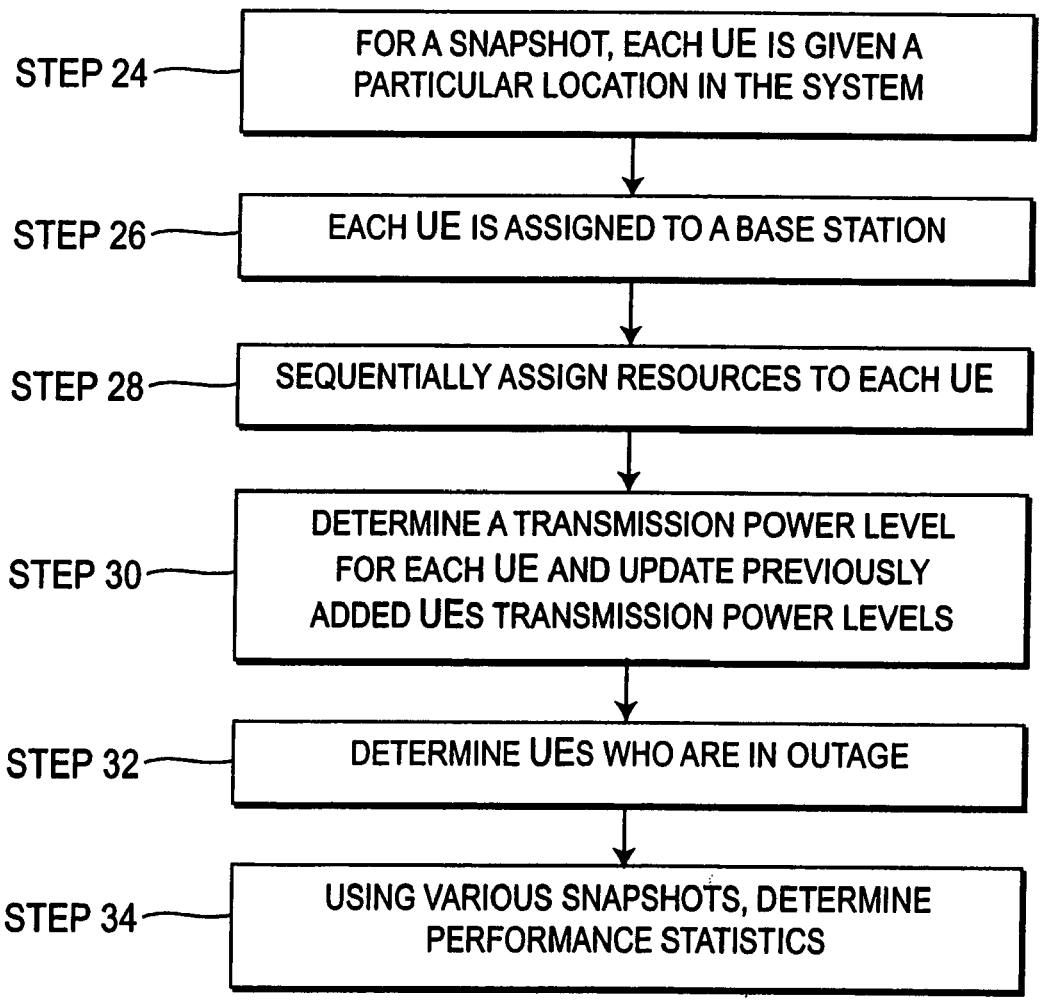
Figure 3:
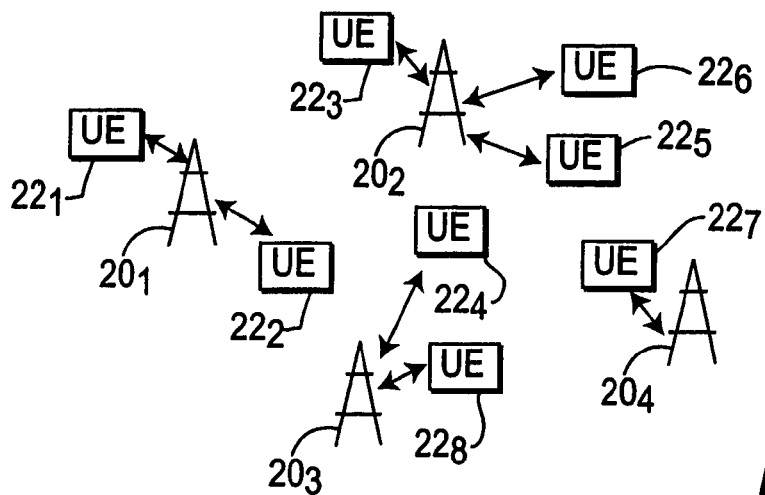
Figure 4:
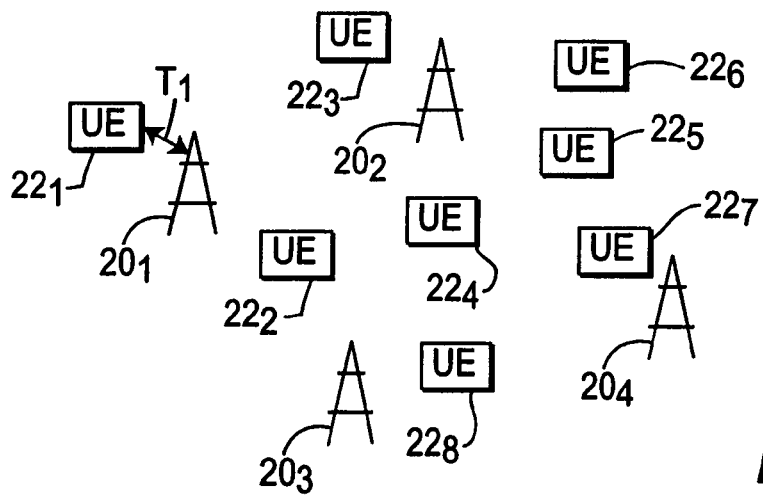
Figure 5:
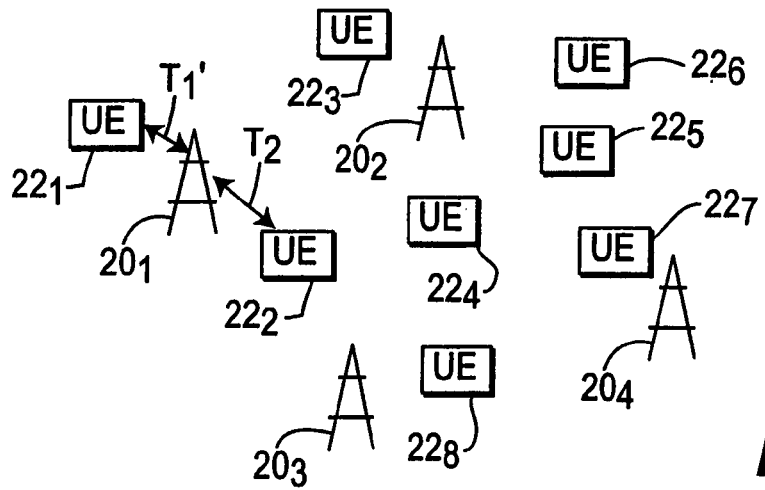

FIG. 1 is an illustration of a simplified wireless code division multiple access (CDMA) communication system.
FIG. 2 is a flow chart of a preferred evaluation technique.
FIG. 3 is an illustration of UEs assigned to base stations.
FIG. 4 is an illustration of adding a first UE to a snapshot.
FIG. 5 is an illustration of adding a second UE to a snapshot.

DETAILED DESCRIPTION OF THE PREFERRED EMBODIMENT(S)

The embodiments of the invention can generally be used with any type of hybrid time-code domain multiple access system, such as a TDD/CDMA, TDMA/CDMA or time division synchronous code division multiple access (TD-SCDMA) communication system, as well as other types of communication systems.

The preferred model uses a snapshot-based simulation and is described in conjunction with the flow chart of FIG. 2. The evaluation of a system is performed at a specified instant in time (snapshot). Each UE 22 is given a particular location in the communication system, step 24. The locations, as well as number, of the UEs 22 are based on the criteria being evaluated in the model. In one application of an evaluation, differing algorithms for radio resource management are being evaluated for a specified number of users in a system. A variety of differing UE locations may be used in different snapshots. A particular algorithm's performance is analyzed in each of the snapshots. The performance statistics for each algorithm over all of the snapshots is used to determine a best algorithm for the particular loading. The UEs 22 may be randomly located in each snapshot to generate the statistics. Alternately, the location of the UEs 22 may be systematically changed to generate the statistics.

In another evaluation application, UE mobility may be analyzed. In each snapshot, a UE 22 or UEs 22 are moved in relation to a previous snapshot. Each snapshot may be separated in time from a previous snapshot by a fixed period of time. The impact of this movement is analyzed for a particular resource allocation or for a particular resource management algorithm.

The UEs 22 are assigned to base stations 20 within the model, step 26. This assignment is illustrated in FIG. 3 by double-headed arrows between a UE 22 and its assigned base station 20. Typically, a UE 22 is assigned to the base station 20 having the strongest signal. However, the base station 20 with the strongest signal may not be assigned to the UE 22, such as UE $22_4$, based on the availability of resources.

If uplink and downlink channels do not interfere with each other, such as they are separated by frequency and/or time, the uplink and downlink can be treated as two separate sub-snapshots. This treatment reduces the complexity in analyzing the models. The following describes deriving a snapshot where uplink and downlink channels interfere with each other. However, the same approach can be applied to the uplink and downlink separately. The combined statistics can be gathered from the two sub-snapshots.

Using the resource management algorithm being tested, sequentially (one by one) each UE 22 is assigned resources of a base station 20 using a resource management algorithm, step 28. Alternately, the UEs 22 may be added in groups. Each group's UEs 22 have little mutual interference. Using the assigned resources, the model determines whether sufficient transmission power exists to reach its target channel quality measurement, such as a target signal to noise ratio (SNR) or signal to interference ratio (SIR). Preferably, each user's transmission power level is estimated using an estimated pathloss between the UE 22 and base station 20 and interference estimates, based on the users already connected. Equation 1 is one potential equation for use in calculating the transmission power level, T, using a target signal to interference ratio ($SIR_{TARGET}$).

$$T = PL \cdot ISCP \cdot SIR_{TARGET} \quad \text{Equation 1}$$

PL is the estimated pathloss between the user and base station 20. The pathloss may be estimated using the distance between the base station 20 and UE 22. ISCP is the interference signal code power. The ISCP may be estimated by the transmissions of other users communicating at the same time as the UE 22, such as transmitting in the same time slot, and the distance between the users.

Initially, a first UE $22_1$ is added to the model as shown in FIG. 4. The transmission power level $T_1$ to achieve a desired channel quality is determined. Users for which the power (either uplink or downlink) is insufficient are blocked (not admitted). As additional users are added to the model, their transmission power levels are determined to achieve the desired channel quality taking into account the interference produced by the already added users. To illustrate, a second UE $22_2$ is added. The transmission power level $T_2$ as shown in FIG. 5 is determined using the previously admitted UE's transmission power level $T_1$. Users may be added one by one or in groups. The groups may be selected so as to minimize their mutual interaction.

After the addition of the new user, the impact of a newly added UE's transmissions is used to adjust the transmission power levels of the new and already added UEs 22, since the new UE's transmissions may interfere with the other UE transmissions, step 30. To illustrate using FIG. 5, a new transmission power level $T_1'$ for UE $22_1$ is determined. The adjusting of the UEs' power levels in response to the new user is preferably performed iteratively until the transmission power levels of all the added users converge. Any users whose power levels cannot reach their desired quality are considered to be in outage and are dropped, step 32. The transmission power level of a UE 22 is limited. If a UE's transmission power level must exceed this limit to meet the desired channel quality, that UE 22 can not reach the desired channel quality.

After all the users have been considered for assignment, the model is complete and the snapshot is terminated. Using various snapshots, statistics of the performance of the system are determined, step 34. One type of system evaluation may be to determine, after addition of a user, whether a session is dropped or the new user can not be admitted. If an existing user can not reach its desired channel quality, that user is considered not admitted. If a new or existing user can not reach its desired quality after addition of a new user, it is considered a dropped user. As a function of the number of users and the distribution of the users within the system, the number of dropped sessions and the number of sessions not admitted is determined to evaluate the allocation algorithm. It is undesirable to not admit sessions. It is extremely undesirable to drop sessions.

The sequential assignment of each user or a group of users reduces the complexity of the model. The change in transmission power level after each sequential assignment can be readily determined. Typically, the calculated transmission power levels will converge rather quickly. By contrast, adding all the users in a single step results in utilizing complex algorithms to calculate the transmission power levels. In such a complex model, the calculated transmission power levels may not converge.

What is claimed is:

1. A method for modeling a wireless code division multiple access communication system, the method comprising:
   providing a plurality of first snapshots, each first snapshot having a plurality of user equipments (UEs) and base stations, locations of the UEs in each first snapshot vary between the first snapshots;
   for each first snapshot, dividing that first snapshot into an uplink and downlink snapshot;
   for the uplink snapshot:
      assigning uplink resources to each UE and determining an uplink transmission power level of that UE; and
      determining dropped and not admitted UEs in the uplink snapshot; and
   for the downlink snapshot:
      assigning downlink resources to each UE; and
      determining dropped and not admitted UEs in the downlink snapshot based on the assigned downlink resources; and
   gathering statistics on a performance of the system using the determined dropped and not admitted UEs.

2. The method of claim 1 further comprising for each first snapshot, gathering statistics for the uplink snapshot and the downlink snapshot and combining the gathered uplink and downlink statistics.

3. The method of claim 1 wherein each UE in the uplink or downlink snapshot is added sequentially and a transmission power level of each UE is determined after each sequential addition.

4. The method of claim 1 wherein a plurality of resource management algorithms is evaluated and statistics for each algorithm are gathered for all of the first snapshots.

5. The method of claim 1 wherein groups of the UEs in the uplink or downlink snapshot are added sequentially and a transmission power level of each UE is determined after each sequential addition.

* * * * *